United States Patent [19]

Matsumoto

[11] Patent Number: 5,072,550
[45] Date of Patent: Dec. 17, 1991

[54] GRINDING METHOD AND GRINDING MACHINE WITH CONTROLLED GRINDING FORCE

[75] Inventor: Yasutami Matsumoto, Yamato, Japan

[73] Assignee: Nippon Seiko Co., Ltd., Tokyo, Japan

[21] Appl. No.: 614,201

[22] Filed: Nov. 16, 1990

[30] Foreign Application Priority Data

Nov. 27, 1989 [JP] Japan .................................. 1-306950

[51] Int. Cl.⁵ .............................................. B24B 49/00
[52] U.S. Cl. .................................. 51/290; 51/281 P; 51/165.77; 51/165.93
[58] Field of Search ................... 51/290, 281 R, 288, 51/281 P, 165 R, 165.71, 165.75, 165.77, 165.87, 165.9, 165.93

[56] References Cited

U.S. PATENT DOCUMENTS

| | | | |
|---|---|---|---|
| 4,117,634 | 10/1978 | Sugita | 51/165.77 |
| 4,505,074 | 3/1985 | Kogure | 51/165.77 |
| 4,604,834 | 8/1986 | Thompson | 51/165.77 |
| 4,956,945 | 9/1990 | Ooshima | 51/165.77 |
| 4,956,946 | 9/1990 | Tsujiuchi | 51/165.77 |

FOREIGN PATENT DOCUMENTS

| | | | |
|---|---|---|---|
| 150972 | 8/1985 | European Pat. Off. | 51/165.77 |
| 136765 | 6/1986 | Japan | 51/165.77 |
| 2015198 | 9/1979 | United Kingdom | 51/165.77 |

Primary Examiner—D. S. Meislin
Assistant Examiner—Blynn Shideler
Attorney, Agent, or Firm—Oblon, Spivak, McClelland, Maier & Neustadt

[57] ABSTRACT

This invention provides a grinding method and a grinding machine therefor with controlled grinding force which detects the grinding force and grinding rate during operations, calculates in real time the threshold force and grinding wheel sharpness coefficient for each grinding cycle by an arithmetic operation unit, monitors the changes in sharpness of the grinding wheel, and properly changes values instructed by the grinding force commands based on the threshold force, the sharpness coefficient and the predetermined grinding rate value for controlling the feed of the grinding wheel. When the deflection of the grinding wheel shaft changes due to the changes in grinding force, the swivel angle of the grinding wheel shaft or a workpiece is adjusted to prevent the surface of the workpiece from tapering.

5 Claims, 8 Drawing Sheets

GRINDING METHOD AND GRINDING MACHINE WITH CONTROLLED GRINDING FORCE

BACKGROUND OF THE INVENTION

1. Field of the Invention

This invention relates to a method for grinding with controlled grinding force and a grinding machine which is suitable to use the method, and more particularly to a grinding method and a grinding machine therefor which monitors the sharpness of a grinding wheel in operations, changes command value for the grinding force corresponding to the detected sharpness of the grinding wheel, and effectively stabilizes the cycle time of the machine.

2. Discussion of the Background

In the prior art grinding systems with controlled grinding force, the grinding force normal to a workpiece is maintained constant during grinding operations irrespective of the changes in sharpness of the grinding wheel. FIG. 7 shows a control system of the prior art grinding method. In finished grinding, a grinding force S is set at a predetermined value higher than a threshold force (marginal grinding force) irrespective of the changes in the grinding wheel diameter, the actual grinding force is detected by a grinding force detector 3, a control device 4 is used to control a feed motor 5 in a manner to make the detected grinding force agree with said value S, and a feed slide of the wheel or a workpiece at a grinding device 6 is moved.

In the aforementioned prior art grinding method, the grinding force is set constantly at a value higher than the threshold force during finish grinding in order to prevent the surface of the workpiece from being tapered, and hence grinding is conducted with the set force constantly. However, the threshold force changes depending on the diameter of a grinding wheel to affect the sharpness thereof, which in turn greatly changes the grinding cycle time to thereby pose a critical problem in stabilization of productivity. More specifically, the threshold force generally becomes larger when the wheel diameter increases while it becomes smaller when the wheel diameter decreases. FIG. 2 shows the relation between the grinding force F and the grinding velocity V wherein reference letters and numerals $F_{01}$ and $F_{02}$ denote respectively the threshold force with a large wheel diameter and the threshold force with a small wheel diameter. The wheel sharpness coefficient K is obtained by multiplication with a constant of the gradient of the linear line in the graph. The sharpness of a grinding wheel is good when the threshold force $F_0$ is smaller and the coefficient K is greater. For example, when the finish grinding force is set at the value $F_f$ in the graph, the grinding velocity becomes $V_1$ when the grinding wheel diameter is large, and $V_2$ ($V_2 > V_1$) when the grinding wheel diameter is small. Assuming that the set value for grinding force $F_f$ is optimal at the start to the quality of the workpiece with the grinding velocity of $V_1$ with a larger diameter wheel, the diameter of the wheel decreases as the grinding operation proceeds. Then, the grinding velocity $V_2$ becomes so high that grinding of the workpiece to the right roundness at the finish becomes inferior, and wear and tear of the wheel is accelerated to thereby increase errors in the axial forms. Conversely, if the finish grinding force is set at the level $F_f$ so as to obtain the optimal velocity $V_2$ or $V_1$ with a smaller wheel diameter, $F_f$ becomes smaller than the threshold force $F_{01}$ for the larger wheel diameter, and therefore grinding becomes impossible. There has been proposed a method to prevent fluctuation in cycle time by changing the grinding force corresponding to the grinding wheel diameter, but the sharpness of the wheel changes due to the changes in the condition of a truer, and in such a case, prediction is impossible and the change of grinding force in advance is also impossible.

There is also known a grinding machine which measures the dullness of the grinding wheel and controls the truing of the grinding wheel based on the measured result of the wheel dullness in order to conduct grinding operations at the maximum efficiency without causing thermal damages on the workpiece (Ref. U.S. Pat. No. 3,745,710). According to said patent, it is proposed that the dullness of a grinding wheel is measured by continuously monitoring either the relation between the grinding force and the feed rate or the relation between the grinding force normal to the wheel surface and the grinding force tangential thereto. There is also known a grinding method which measures the normal resistance vectors between the grinding wheel and the workpiece and changes the feed rate relative between the grinding wheel and the workpiece depending on the intensity of the normal resistance vectors.

SUMMARY OF THE INVENTION

In view of the foregoing, the present invention aims at providing a grinding method and a grinding machine therefor with controlled grinding force which calculates for each grinding cycle the threshold force $F_0$ which is a parameter of the sharpness of the grinding wheel and the sharpness coefficient K to monitor the sharpness/dullness of the grinding wheel, automatically calculates and sets a suitable grinding force, and thereby stabilizes the cycle time.

The above object of the present invention is achieved by a grinding method which contains a step of calculating the threshold force and the grinding wheel sharpness coefficient K for each cycle out of the grinding velocity and the grinding force which have been detected during grinding operation, a step of obtaining the grinding force command value from the threshold force, the grinding wheel sharpness coefficient K and a predetermined grinding velocity, and a step of conducting the feed control of the wheel or a workpiece in a manner that the actual grinding force is made to agree with the grinding force command value.

The grinding machine according to the present invention comprises a grinding velocity setting unit which sets target grinding velocities for rough and finish grindings, a grinding force detector unit which detects actual grinding force of the grinding wheel, a grinding velocity detector which detects the actual grinding velocity of the grinding wheel, an arithmetic operation/command unit which calculates arithmetically the threshold force and the grinding wheel sharpness coefficient out of the detected actual grinding force and velocity, and calculates the rough and finish grinding forces out of the grinding wheel sharpness coefficient and threshold force as well as the target speeds for rough and finish grindings inputted from said grinding velocity setting unit, and outputs commands for rough and finish grinding forces, and a feed control device which receives as input said rough and finish grinding force commands and said actually measured grinding force and outputs feed control signals to a driving device in a manner that said actually measured grinding force becomes identical to the values instructed by the rough and finish grinding force commands.

According to this invention method, the grinding force and velocity during operations are detected, the threshold force and grinding wheel sharpness coefficient are arithmetically calculated in real time by an arithmetic operation unit to thereby monitor changes in sharpness/dullness of the grinding wheel, and the grinding force command is suitably adjusted for grinding based thereon. This minimizes fluctuations in cycle time. The deflection of the grinding wheel spindle may become changed due to the changes in grinding force, but according to the present invention, not only the grinding force but also the swivel angle of a workpiece or a grinding wheel spindle are adjusted to prevent tapering of the workpiece surface.

BRIEF DESCRIPTION OF THE DRAWINGS

The foregoing and other objects, features and advantages of the invention will be apparent from the following more particular description of the preferred embodiments of the invention illustrated in the accompanying drawings, wherein.

DESCRIPTION OF THE PREFERRED EMBODIMENTS

Figure 1:
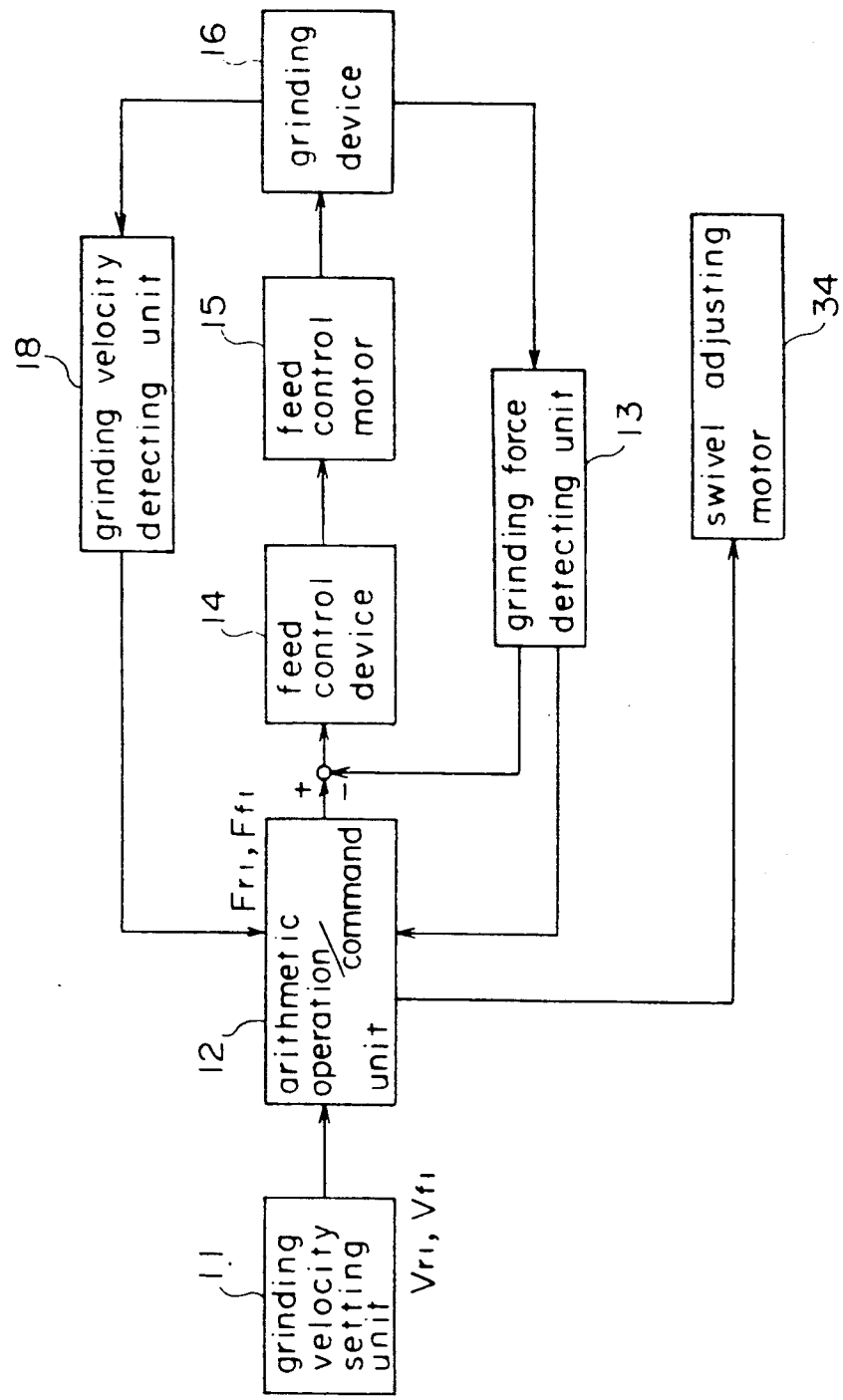
FIG. 1 is a block diagram to show a control system to be used when this invention grinding method with controlled grinding force is realized.
Figure 3:
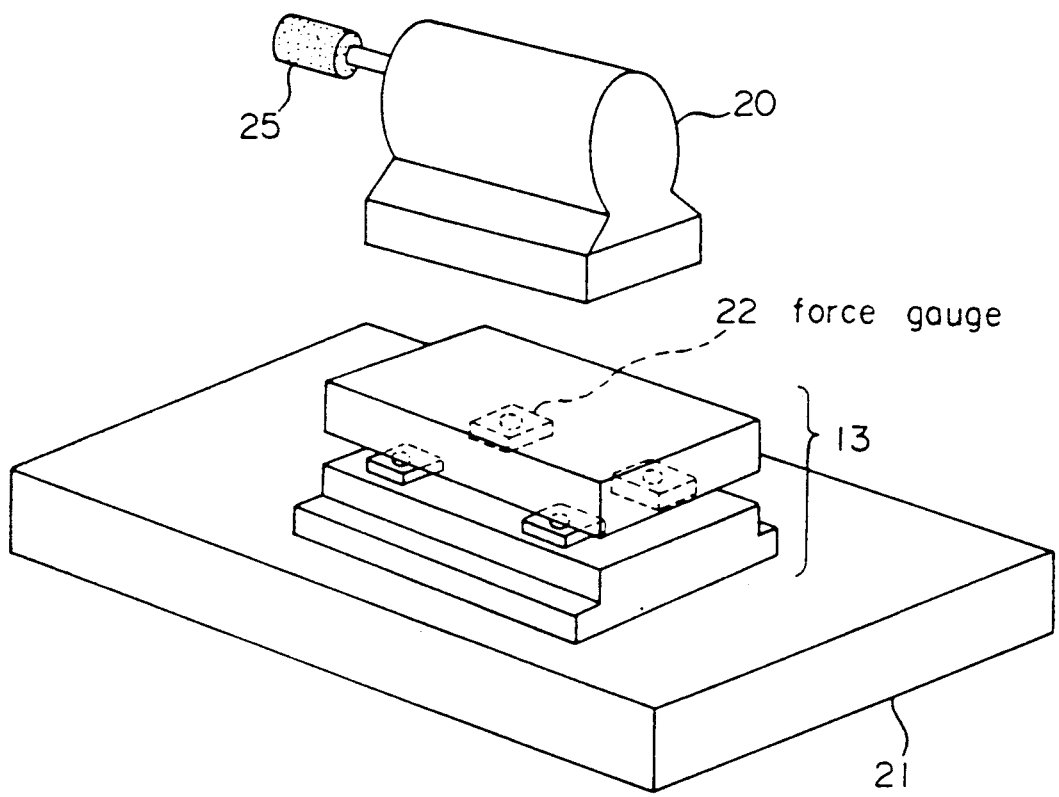
FIG. 3 is a perspective view to show an embodiment of a piezoelectric force gauge of the detecting means for normal grinding force.

Referring to FIG. 1, the grinding machine according to the present invention comprises a grinding velocity setting unit 11, an arithmetic operation/command unit 12, a grinding force detecting unit 13, a grinding velocity detecting unit 18, a feed control device 14, a feed control motor 15 and a grinding device 16. The grinding velocity setting unit 11 first sets the target grinding velocities $V_{r1}$, $V_{f1}$ for rough and finish grindings. The arithmetic operation/command unit 12 calculates the grinding wheel sharpness coefficient K (which will be described later in more detail) and the threshold force $F_0$ out of the actual grinding force detected by the detecting unit 13 and the grinding velocity obtained by the detecting unit 18. Simultaneously, the unit 12 calculates the rough and finish grinding forces out of the rough and finish grinding target velocities $V_{r1}$ and $V_{f1}$ set by the unit 11 and said sharpness coefficient K and said threshold force $F_0$, and outputs the commands for rough and finish grinding forces. The difference signal between said rough and finish grinding force commands and the actual grinding force outputted from said detecting unit 13 is taken in by the feed control device 14, and the device 14 operates the motor 15 based on the difference signals so as to control the rough and finish grinding force at constant values. Correspondingly, a feed slide of a grinding wheel or a workpiece is moved by the grinding device 16. The detecting unit 18 preferably includes a work gauge and differential calculator (not shown) which differentiates the output signals from said work gauge so that the dimension output signals are differentiated to obtain the speed signals. As shown in FIG. 3, the grinding force detecting unit 13 includes four piezoelectric type force gauges 22 for detection of the normal vectors which are provided between a grinding wheel spindle device 20 and a feed table 21 so that the normal grinding force may be detected by calculating the sum of the indications on the four force gauges 22. Besides the piezoelectric type used, the gauge may be a strain gauge.

Calculation of the grinding force commands for rough and finish grindings by the unit 12 will now be described. The threshold force $F_0$ and grinding wheel sharpness coefficient K are obtained for each grinding cycle according to the equations below using the grinding velocities and grinding forces for both rough and finish grindings, $V_r$, $F_r$, $V_f$, $F_f$, which are actually measured.

$$F_0 = \frac{V_r F_f - V_f F_r}{V_r - V_f} \qquad (1)$$

$$K = \frac{V_r - V_f}{F_r - F_f} \times \frac{\pi D W}{2} \qquad (2)$$

wherein the letter D denotes the diameter of a workpiece and W the width of grinding. The grinding velocities $V_r$ and $V_f$ for rough and finish grindings are expressed in terms of the changes in the workpiece diameter per a unit time. When a workpiece is ground and the values $F_0$ and K are calculated according to the above equations, then the command value $F_{r1}$ for rough grinding and the command value $F_{f1}$ for finish grinding are obtained by means of the target grinding velocities $V_{r1}$ and $V_{f1}$ which are set at the setting unit 11 in accordance with the equations below.

$$F_{r1} = F_0 + \frac{V_{r1}}{K} \times \frac{\pi D W}{2} \qquad (3)$$

$$F_{f1} = F_0 + \frac{V_{f1}}{K} \times \frac{\pi D W}{2} \qquad (4)$$

Figure 2:
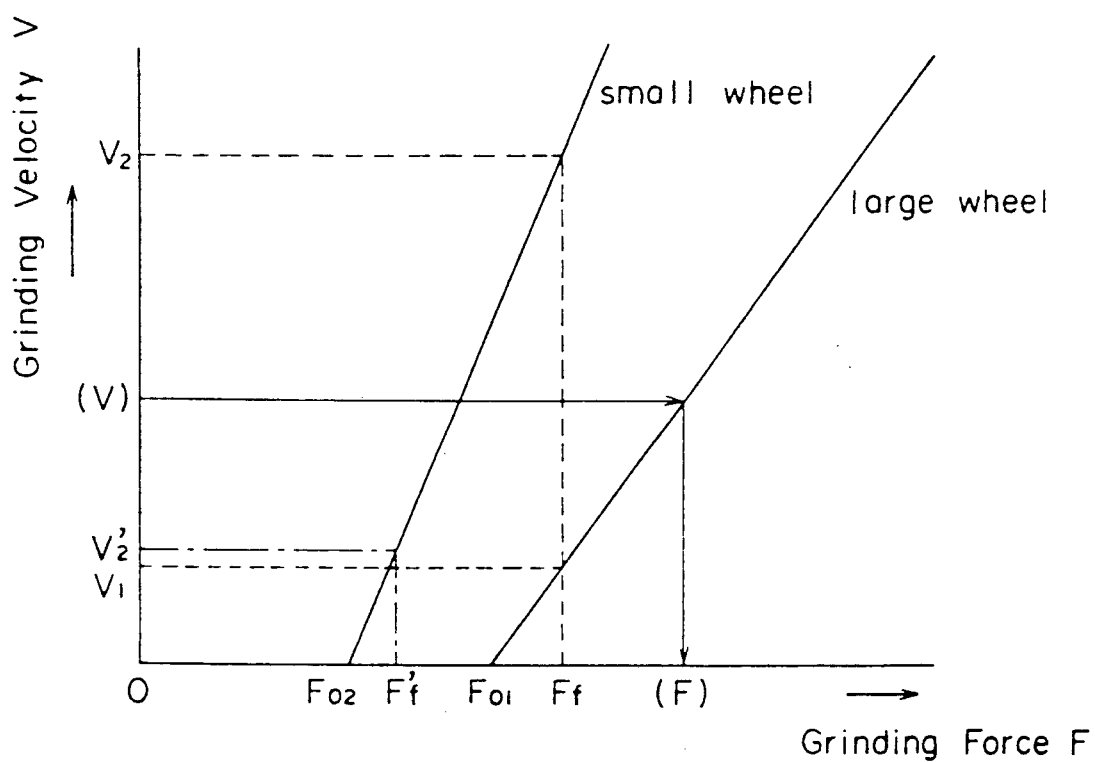
FIG. 2 is a graph to show the relation between the grinding force and the grinding velocity.

The above equations express the fact that in the graph in FIG. 2, a grinding force (F) is sought for a target grinding velocity (V) at a certain sharpness of the grinding wheel and at a larger diameter thereof. The sharpness does not remarkably change between grinding operations on two workpieces. Therefore, if the calculation for $F_0$ and K, and the calculations for commands $F_{r1}$ and $F_{f1}$ for the next grinding cycle based on the calculated $F_0$ and K are repeated sequentially, the grinding velocity (V) can be approximated to the target grinding velocities $V_{r1}$ and $V_{f1}$ to thereby keep the cycle time stable.

Figure 4A:
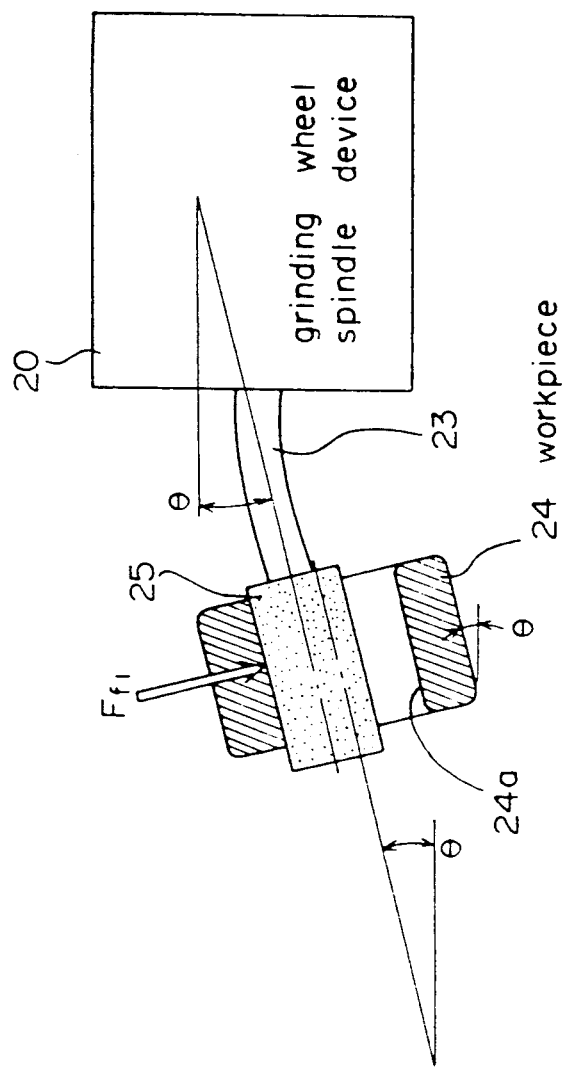
FIGS. 4A and 4B are plan views which show in exaggeration the states of deflection of a grinding wheel spindle during operation.
Figure 4B:
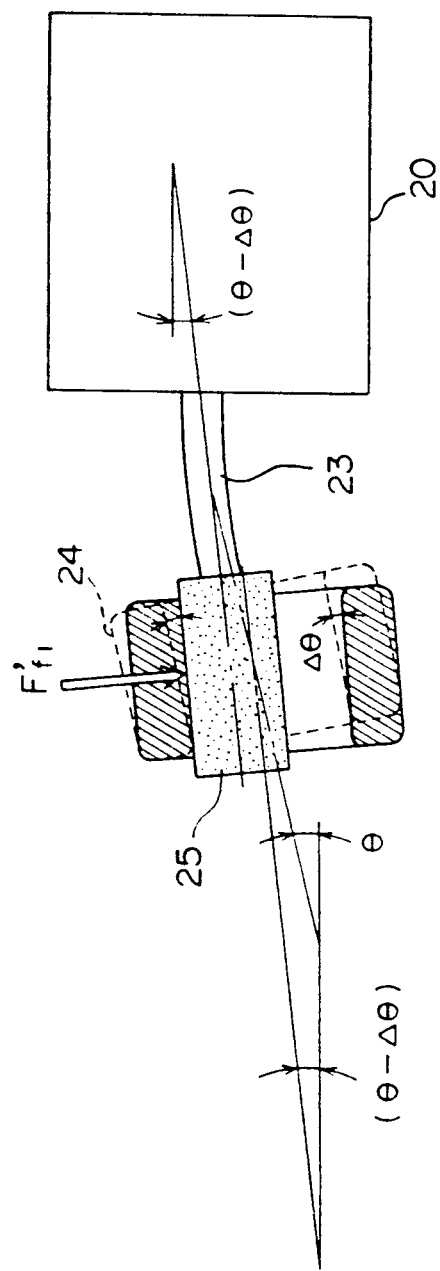

However, when grinding is conducted while changing the command values depending on the changes in said sharpness, then the taper errors due to the deflection of the spindle of the grinding wheel will cause a problem. FIGS. 4A and 4B show deflection of a grinding wheel spindle 23 during grinding in plan view but in exaggeration. FIG. 4A shows a case wherein a large finish grinding command value $F_{f1}$ with a low grinding wheel sharpness is given and the grinding wheel spindle 23 is inclined by the angle $\theta$. According to this invention method, the swivel angle of a workpiece 24 is inclined by the same angle $\theta$ in order to offset the inclination. This makes the grinding surface 24a of the workpiece 24 to be positioned in parallel to the axial line of the grinding wheel 25 to eliminate taper errors. FIG. 4B shows a case wherein a small finish grinding force command value $F_{f1'}$ with a high grinding wheel sharpness is given and the deflection angle of the grinding wheel spindle 23 decreases from $\theta$ to $(\theta - \Delta\theta)$ and causes taper errors of $\Delta\theta$ on the workpiece as indicated by chained lines. In order to eliminate such errors, the command value $F_{f1'}$ is changed and at the same time, the swivel angle of the workpiece 24 is adjusted by $\Delta\theta$. The adjusting angle $\Delta\theta$ may be obtained as a function of the rigidity of the spindle and the changes in commands $\Delta F_{f1}$ ($=F_{f1}-F_{f1'}$). The swivel angle may be adjusted on the support side of the spindle 23. The swivel angle does not need adjustment if the taper errors remain within a tolerance of the workpiece quality.

Figure 5:
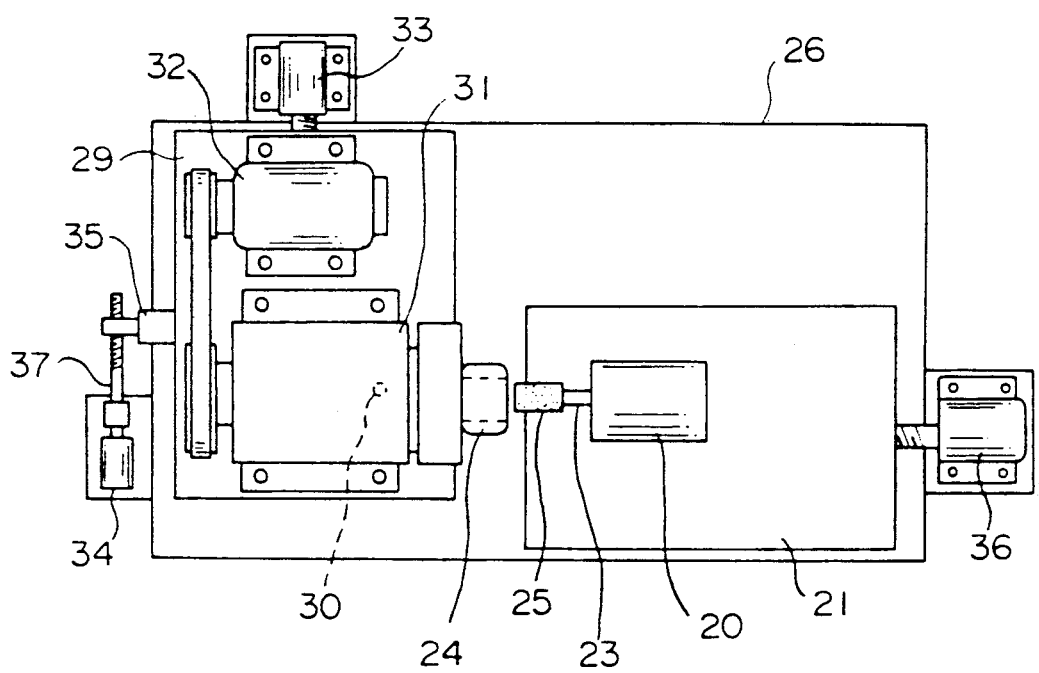
FIG. 5 is a plan view to show a grinding machine having a swivel angle adjusting function according to an embodiment of this invention.

FIG. 5 is a schematic plan view of a grinding machine having a swivel angle adjusting function to embody this invention method. A grinding wheel spindle device 20 is mounted on a bed 26 of the grinding machine via the feed table 21, and a grinding wheel 25 is rotatably fixed on a top of the spindle 23. A swivel plate 29 is journalled on a pivot 30 on the bed 26, and a workhead base 31 for the workpiece 24, a spindle motor 32, and a feed motor 33 of the workhead base 31 are mounted on said swivel plate 29. On the bed side is mounted a swivel adjusting motor 34, and a ball screw shaft 37 is connected to the output shaft of the motor 34. On the side of the swivel plate 29 is fixed an operating member 35 including a ball screw nut which is matable with the ball screw shaft 37. When the swivel adjusting motor 34 is actuated, the swivel plate 29 and the workhead base 31 are rotated on the pivot 30 via the operating member 35 to adjust the swivel angle of the workpiece 24. The reference numeral 36 denotes a driving motor for the feed table 21.

The present invention method described in the foregoing embodiment contains a step of monitoring in each cycle time the sharpness of the grinding wheel from the threshold force $F_0$ and the grinding wheel sharpness coefficient K and changing the value instructed by the grinding force command correspondingly, but this invention method in the alternate embodiment may also be realized by stabilizing the cycle time in advance. The embodiment will now be described.

The sharpness of a grinding wheel may change depending on the diameter of the grinding wheel or the truing thereof. For example, the sharpness of a CBN grinding wheel is poor immediately after truing, but as the operation proceeds, the sharpness of said wheel improves. In such a case, the method comprising (A) through (C) below will be adapted.

Figure 6A:
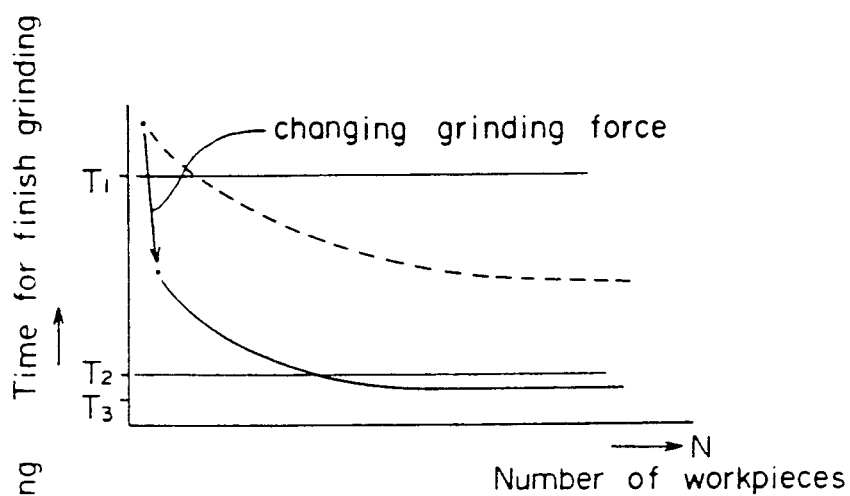
FIGS. 6A, 6B and 6C are graphs to show relationship between the number of workpieces and time required for finish grinding under different grinding forces.

(A) As shown in FIG. 6A, immediately after truing of a grinding wheel, when the first workpiece has been ground, and if the time for the finish grinding (with a grinding allowance kept constant) is longer than the set time $T_1$ (or the cycle time immediately after truing becomes excessively long), this method is adapted to change the grinding force commands for rough and finish grindings so that the cycle time will agree with the target values by using the equations (3) and (4) with the target grinding velocities of $V_{r0}$ and $V_{f0}$ for the first workpieces, expecting the sharpness will improve even though it is not stable at the current time point. This is based on the thinking that the cycle time is expected to approach close to the target value when the grinding operation proceeds and the sharpness is stabilized. Therefore, the target grinding velocities $V_{r0}$ and $V_{f0}$ are set at values lower than the target velocities, $V_{r1}$ and $V_{f1}$, in stabilized state. More specifically, anticipating that the sharpness of the grinding wheel will improve to a certain degree after truing, the cycle time is set to become stable evenly even if the cycle time is somehow excessively long immediately after the truing.

Figure 6B:
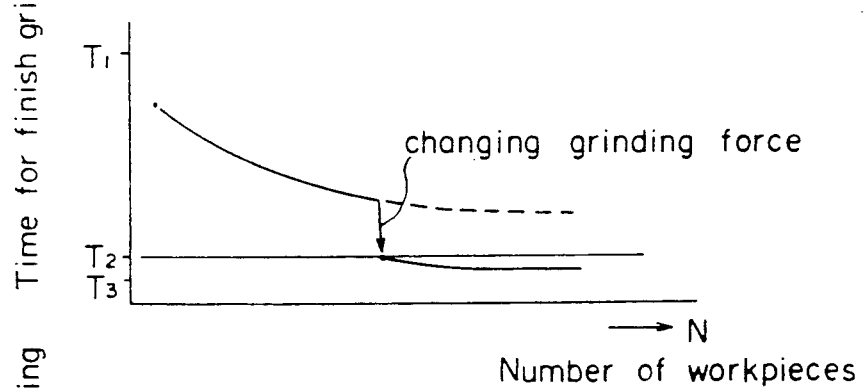

(B) After the truing of the wheel, several workpieces have been ground, and when the sharpness of the grinding wheel becomes stable but the time for finish grinding is longer than the set time $T_2$ (when $T_2 < T_1$), the grinding force command values, $F_{r1}$, $F_{f1}$ for rough and finish grindings are changed by using the equations (3) and (4) with the target grinding velocities $V_{r1}$ and $V_{f1}$ (when $V_{r1} > V_{r0}$, $V_{f1} > V_{f0}$) in the stable state to thereby stabilize the cycle time in average. It is shown in FIG. 6B. Whether or not the sharpness is stabilized is judged as follows. The sharpness is judged to have been stabilized when (1) the difference becomes sufficiently small in the sharpness coefficient K or in the threshold force $F_0$ between the workpiece presently being ground and the workpiece which is ground immediately before the present one, (2) the difference becomes sufficiently small in the finish grinding time between the present workpiece and the one ground immediately before the present one, (3) $N_1$ number of workpieces have been ground (the number $N_1$ is empirically determined), and (4) the time for finish grinding is shorter than $T_3$ (when $T_3 < T_2 < T_1$) after truing of the grinding wheel but before a predetermined number of workpieces are ground. When the sharpness is judged to have been stabilized, the grinding force command values are changed by the equations (3) and (4).

Figure 6C:
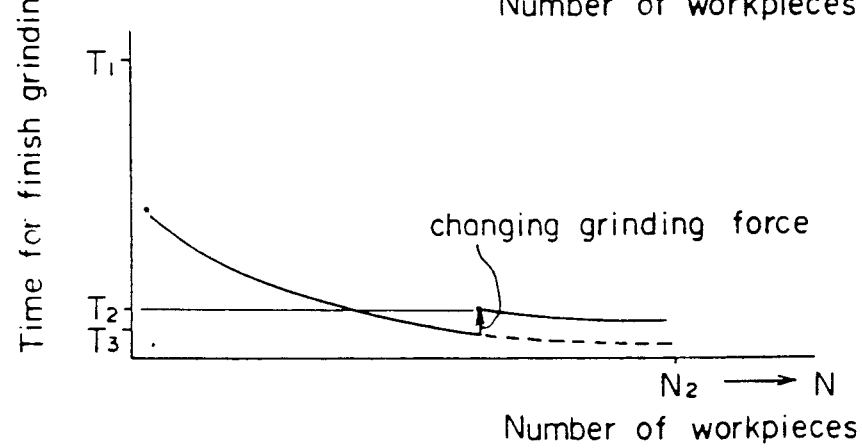
Figure 7:
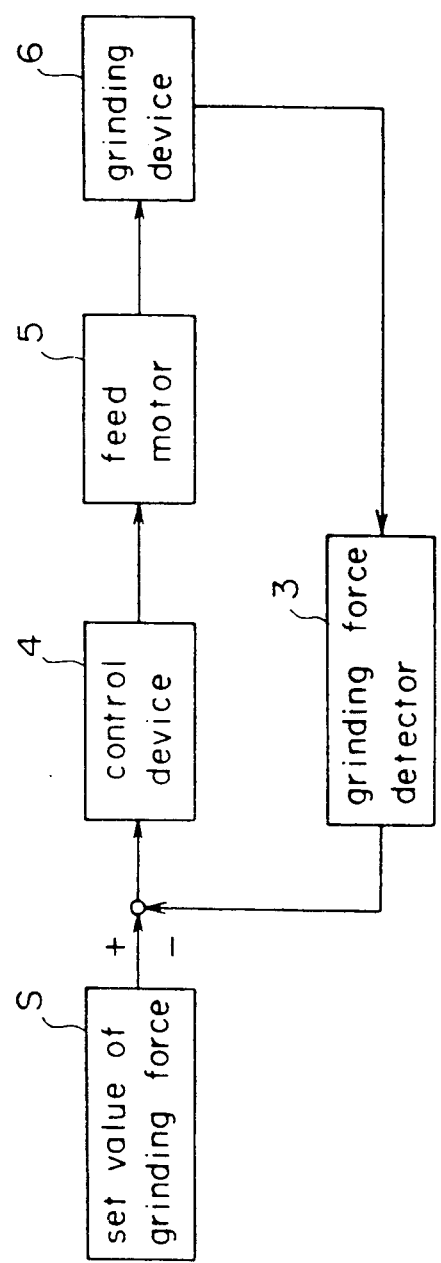
FIG. 7 is a block diagram to show the control system of the prior art grinding method.

(C) After truing of the grinding wheel, if the time for finish grinding is shorter than $T_3$ (when $T_3 < T_2 < T_1$) before a predetermined number $N_2$ of workpieces are ground, or when the cycle time is too fast, the roundness is likely to deteriorate if the grinding operation is continued without changing truing. In such a case, before the number of ground workpieces reaches $N_2$, by using the same target grinding velocities $V_{r1}$ and $V_{f1}$ as the said (B), the grinding force command values $F_{r1}$ and $F_{f1}$ are changed as shown in FIG. 6(C). Calculations (A) through (C) are conducted by the arithmetic operation/command unit 12, and then instructions are issued to the feed control device 14.

According to this invention, the cycle time may be stabilized irrespective of the changes in sharpness by monitoring the sharpness of the grinding wheel during the grinding operation or by predicting the changes in sharpness, and changing command for grinding force values correspondingly. This invention method can also reduce defects in roundness of the workpieces, wear and tear of the grinding wheel and errors in axial shape. This invention method can prevent generation of taper errors simply by adjusting the swivel angle of the grinding wheel to thereby improve the quality, durable life of the grinding wheel and productivity in grinding operations.

What is claimed is:

1. A grinding method with controlled grinding force in rough grinding operation and finish grinding operation, said grinding method comprising:

the process of detecting a grinding velocity and a grinding force during the rough and finish grinding operations, obtaining for each machining cycle a threshold force $F_0$ and a grinding wheel sharpness coefficient K out of the detected rough and finish grinding velocities and the detected rough and finish grinding forces using the following equations (1), (2):

$$K = \frac{V_r - V_f}{F_r - F_f} \times \frac{DW}{2} \quad (1)$$

$$F_0 = \frac{V_r F_f - V_f F_r}{V_r - V_f} \quad (2)$$

wherein:
$V_r$: detected grinding velocity in rough grinding cycle,
$V_f$: detected grinding velocity in finish grinding cycle,
$F_r$: detected grinding force in rough grinding cycle,
$F_f$: detected grinding force in finish grinding cycle,
D: workpiece diameter,
W: width of grinding, calculating rough and finish grinding force command values $F_{r1}$, $F_{f1}$ out of the threshold force $F_0$, the grinding wheel sharpness coefficient K and target grinding velocities $V_{r1}$, $V_{f1}$ which have been preset, for rough and finish grinding using the following equations (3), (4):

$$F_{r1} = F_0 - \frac{V_{r1}}{K} \times \frac{\pi DW}{2} \quad (3)$$

$$F_{f1} = F_0 - \frac{V_{f1}}{K} \times \frac{\pi DW}{2} \quad (4)$$

obtaining the difference in signals between the detected grinding forces $F_r$, $F_f$ and the grinding force command values $F_{r1}$, $F_{f1}$ for rough and finish grinding cycles respectively, and controlling each grinding wheel feeds in rough and finish grinding cycles in a manner to make said difference in signals become substantially zero and to make detected grinding forces $F_r$, $F_f$ agree with said grinding force command values $F_{r1}$, $F_{f1}$ respectively.

2. The grinding method with controlled force as claimed in claim 1 wherein a deflection angle of the grinding wheel spindle deviated from an axis of a workpiece to be caused in changing the finish grinding force command value $F_{f1}$, is offset by adjusting the swivel angle of the workpiece or the grinding wheel spindle corresponding to said finish grinding force command value.

3. A grinding machine with controlled grinding force comprising a grinding velocity setting unit which sets target grinding velocities for rough and finish grindings, a grinding force detecting unit which detects actual grinding force of a grinding wheel, a grinding velocity detecting unit which detects actual grinding velocity of the grinding wheel, an arithmetic operation/command unit which calculates a grinding wheel sharpness coefficient and threshold force out of the detected actual grinding force and velocity, calculates grinding forces for rough and finish grindings out o said grinding wheel sharpness coefficient, said threshold force and target grinding velocities for rough and finish grindings inputted from said grinding velocity setting unit and outputs commands for rough and finish grinding forces, and a feed control device which receives as input said rough and finish grinding force commands and said detected actual grinding force and outputs feed control signals in a manner that said detected actual grinding force is made to agree with said commands for rough and finish grinding forces.

4. The grinding machine with controlled grinding force as claimed in claim 3 wherein said grinding velocity detecting unit includes a workpiece dimension measurement unit and a differentiating calculator which differentiates the output signals from said measurement unit and outputs velocity signals.

5. The grinding machine with controlled grinding force as claimed in claim 3 wherein a grinding wheel spindle device or a workhead base is rotatably supported on a bed, and a swivel angle adjusting mechanism is provided between said bed and said grinding wheel spindle device or said workhead base in order to offset deflection of the grinding wheel spindle caused by grinding force.

* * * * *